US010290283B1

(12) United States Patent
Gupta et al.

(10) Patent No.: US 10,290,283 B1
(45) Date of Patent: May 14, 2019

(54) GREY LEVEL-BASED PAGE TURN ADJUSTMENT

(71) Applicant: Amazon Technologies, Inc., Seattle, WA (US)

(72) Inventors: Siddharth Gupta, San Bruno, CA (US); Jerry Yee-Ming Chung, Los Altos, CA (US); Haili Wang, Fremont, CA (US); Herve Jacques Clement Letourneur, San Francisco, CA (US); Kathryn Chinn, San Francisco, CA (US); Nadim Awad, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/681,190

(22) Filed: Aug. 18, 2017

Related U.S. Application Data

(63) Continuation of application No. 14/817,014, filed on Aug. 3, 2015, now Pat. No. 9,773,474.

(51) Int. Cl.
| | | |
|---|---|---|
| *G09G 5/02* | (2006.01) | |
| *G09G 5/10* | (2006.01) | |
| *G06T 1/60* | (2006.01) | |
| *G06T 11/60* | (2006.01) | |
| *G09G 5/18* | (2006.01) | |

(52) U.S. Cl.
CPC ............... *G09G 5/10* (2013.01); *G06T 1/60* (2013.01); *G06T 11/60* (2013.01); *G09G 5/02* (2013.01); *G09G 5/18* (2013.01); *G09G 2380/14* (2013.01)

(58) Field of Classification Search
CPC .... G09G 3/3607; G09G 5/02; G09G 2380/14; G09G 3/2007; G09G 3/2044; H04N 1/32251; H04N 1/40018
See application file for complete search history.

(56) References Cited

U.S. PATENT DOCUMENTS

| | | | |
|---|---|---|---|
| 6,213,653 | B1 | 4/2001 | Borg et al. |
| 7,016,532 | B2 | 3/2006 | Boncyk et al. |
| 7,940,281 | B2 | 5/2011 | Wang et al. |
| 9,245,485 | B1 | 1/2016 | Hu |
| 9,514,667 | B2 | 12/2016 | Lin |
| 2015/0097879 | A1 | 4/2015 | Reeves |
| 2015/0206115 | A1* | 7/2015 | Matsunaga .......... G06Q 20/145 358/2.1 |

OTHER PUBLICATIONS

Office Action for U.S. Appl. No. 14/817,014, dated Feb. 7, 2017, Gupta, "Grey Level-Based Page Turn Adjustment", 9 pages.

\* cited by examiner

*Primary Examiner* — Antonio A Caschera
(74) *Attorney, Agent, or Firm* — Lee & Hayes, P.C.

(57) ABSTRACT

A content item to be displayed via a display of an electronic device may be associated with a first set of grey values or a set of color values. The electronic device may generate, maintain, or at least have access to one or more mappings that map the set of color values and/or the first set of grey values to a second set of grey values. Based on the one or more mappings, the electronic device may convert a color value of the set of color values or a first grey value of the first set of grey values to a second grey value of the second set of grey values. The content item may then be displayed utilizing the second grey value.

20 Claims, 6 Drawing Sheets

GREY LEVEL-BASED PAGE TURN ADJUSTMENT

CROSS-REFERENCE TO RELATED APPLICATIONS

This application is a continuation of, and claims priority to, co-pending, commonly-owned U.S. patent application Ser. No. 14/817,014, entitled "Grey Level-Based Page Turn Adjustment," filed on Aug. 3, 2015, which is incorporated herein in its entirety by reference.

BACKGROUND

Many users enjoy entertainment through the consumption of digital content, such as music, movies, images, electronic books, and so on. These users employ various electronic devices to consume (e.g., read or otherwise view) such content. Among these electronic devices are electronic book (eBook) reader devices, cellular telephones, personal digital assistants (PDAs), portable media players, tablet computers, and the like. In the context of a user reading an eBook using an eBook reader device, the user may turn pages of the eBook in order to read subsequent pages of the eBook. Upon the user performing some action indicating an intent to turn a page of the eBook, the amount of time between that action and the time at which the next page is displayed to the user corresponds to a page turn time. When the page turn time is slow, the user is forced to wait until the next page of the eBook is displayed via the display of the eBook reader device, which may result in a poor user experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
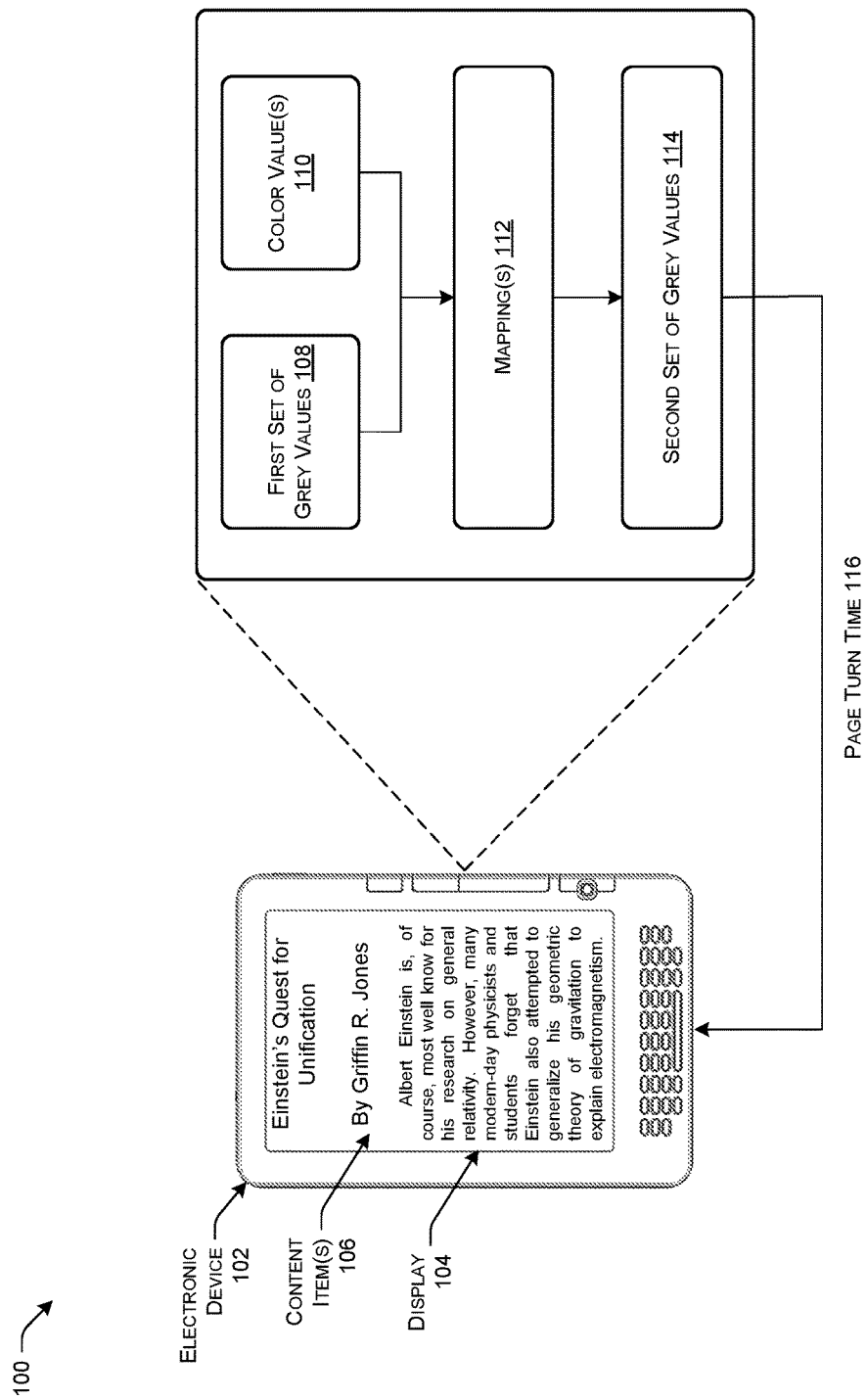
FIG. 1 illustrates an example electronic device that may increase page turn time associated with a content item based on a mapping between grey values/levels and/or color values.

This disclosure describes, in part, techniques for displaying a content item via a display of an electronic device and/or increasing a page turn time associated with consumption of the content item based on a mapping between a first set of grey values or a set of color values and a second set of grey values. More particularly, when a user performs some action (e.g., actuating a button, a swipe, a voice command, etc.) to indicate an intent to turn a page of a content item (e.g., an eBook) being displayed via a display of an electronic device (e.g., an eBook reader device), there will be some delay before a subsequent page is displayed. This delay between the user action and the display of the subsequent page may be referred to as a page turn time. Minimizing the page turn time may result in a more positive user experience.

Typically, the page turn time may depend upon a variety of factors, which may include the number of grey values (also referred to herein as grey levels or grey scale values) used to display the content included in the pages of the content item. For instance, displaying the content using sixteen grey values may result in a first page turn time (e.g., 0.5 seconds). However, utilizing a lesser amount of grey values, such as four grey values, may reduce the page turn time (e.g., a second page turn time), which may result in a better user experience. Since the electronic device may typically display the content item utilizing sixteen grey values, the electronic device may have to generate or otherwise use a mapping to convert the sixteen grey values to the four grey values. The mapping may map multiple ones of the sixteen grey values to each of the four grey values, as will be discussed in additional detail herein. As a result, the content item may be rendered and displayed by the electronic device using four grey values, as opposed to sixteen grey values.

In some embodiments, particular portions of the content item may be in color, and have various color values (e.g., red-green-blue (RGB) values), yet the electronic device may elect to display the content item as a set of greyscale images in order to minimize the page turn time. As a result, the electronic device may convert color values to grey values utilizing one or more mappings, where the mappings associate or map specific color values to specific grey values. Based on one or more of the mappings, the electronic device may display color images of the content item as greyscale images using the grey values determined from the one or more mappings.

The electronic device may also determine the context of the content item, meaning that the electronic device may determine specific content (e.g., text, flat images, complex images, etc.) that is included on a page of the content item. In order to display the different types of content appropriately, the electronic device may select different mappings for the different types of content. That is, the electronic device may select a first mapping for text in order to determine a first grey value for a corresponding first color value, and select a second mapping for an image to determine a second grey value for a corresponding second color value associated with the image. As a result, the grey values used to display content included on a particular page may vary.

The techniques described herein may be implemented in a variety of ways and by a variety of electronic devices. While a few examples are illustrated and described below, it is to be appreciated that other electronic devices may implement these techniques. Furthermore, it is noted that because electronic books are structured as virtual frames presented on a computing device, the term "page" as used herein refers to a collection of content presented at one time on a display. Thus, "pages" as described herein are not fixed permanently, and may be redefined or repaginated based on variances in display conditions, such as screen size, font type or size, margins, line spacing, resolution, or the like.

In addition, the term "electronic device", "electronic book", "eBook", "content", or "content item" as used herein, may include any type of content which can be stored and distributed in digital form. By way of illustration, and without limitation, electronic books and content items can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

FIG. 1 illustrates an example system that includes an electronic device 102 and that determines or adjusts a page turn time of content being displayed by the electronic device 102 based on a mapping between a first set of grey values or color values and a second set of grey values. For the purpose of this discussion, a grey value (or a grey level) may correspond to a numerical value that indicates the brightness and/or reflectiveness of a pixel. A grey value may correspond to the color black, the color white, and/or any other color in between black and white. That is, a grey value may correspond to any shade or tone of grey that ranges between black and white. In various embodiments, the minimum grey value is zero, and the largest grey value may depend upon the number of grey values being used to display content via the electronic device 102.

As shown, the electronic device 102 may include a display 104 and one or more content item 106 that may be presented via the display 104. The user of the electronic device 102 may interact with the electronic device 102 (e.g., an eBook reader device) for the purpose of consuming (e.g., reading) the content item 106 (e.g., an eBook). For instance, the user may perform some action (e.g., pressing a button, interacting with a touch-sensitive interface, uttering a voice command, etc.) to update or turn the page of the content item 106. As a result, a new page (e.g., an updated page, a prior page, a subsequent page, etc.) of the content item 106 will be displayed via the display 104. However, after the user performs the above action, there may be some delay before the new page is displayed. This delay may be referred to as a page turn time. In order to create a positive user experience for the user, the page turn time should be minimized without significantly reducing the quality of the content being displayed via the display 104. That is, it may be beneficial to reduce the page turn time without reducing the resolution of the display 104, causing the content item 106 to appear blurry, etc. Generally, as the page turn time is reduced, the granularity of the content displayed by the electronic device 102 may be decreased.

In certain embodiments, the display 104 of the electronic device 102 may present the content item 106 using a certain number of grey values/levels, such as sixteen grey values/levels. The number of grey values may be based on the particular waveform being used by the electronic device 102. By reducing the number of grey values/levels used to display the content item 106, such as by the electronic device 102 utilizing a different waveform, the page turn time may be reduced. That is, the electronic device 102 may reduce the page turn time, or reduce the amount of time to update a page, by reducing the number of grey values from sixteen grey values to four grey values. However, the electronic device 102 may have to determine how this conversion is to occur, and may have to determine which grey values will constitute the reduced number of grey values (e.g., the four grey values).

As illustrated in FIG. 1, the electronic device 102 may be configured to display the content item 106 via the display 104 using a first set of grey values 108. In various embodiments, the first set of grey values 108 may correspond to sixteen grey values. In such an embodiment, the first grey value may correspond to the color black, the sixteenth grey value may correspond to the color white, and the second through fifteenth grey values may correspond to different shades or tones of grey between black and white. That is, the interim fourteen grey values between black and white may correspond to shades of grey that range from darker grey (near the first black value) to lighter grey (near the last white value). The first set of grey values 108 may be used to render and display greyscale images associated with the content item 106 that are displayed via the display 104. Each grey value of the first set of grey values 108 may represent a different shade of grey associated with content included within the content item 106 that is presented via the display 104.

In additional embodiments, content included within the content item 106 may have corresponding color values 110, meaning that certain text, images, graphics, etc., associated with the content item 106 may be of a particular color. For the purposes of this discussion, a color value 110 may correspond to an RGB value that represents a color of a particular pixel. The RGB values may be based on the RGB color model, which may correspond to an additive color model in which red, green, and blue light are added together in various ways to reproduce a broad array of colors. Since the content item 106 may be displayed in greyscale in order to decrease or minimize the page turn time associated with a content item 106, the color values 110 associated with the content item 106 may be converted to grey values, as will be described in additional detail below.

The electronic device 102, or remote computing resources associated with the electronic device 102, may utilize one or more mappings 112 to convert the first set of grey values 108 and/or the color values 110 into a second set of grey values 114, or to determine the second set of grey values 114 from the first set of grey values 108 and/or the color values 110. In certain embodiments, the second set of grey values 114 may include a lesser number of grey values (e.g., four grey values) as compared to the first set of grey values 108 (e.g. sixteen grey values). Provided that the second set of grey values 114 includes four grey values, the four grey values may include the color black, the color white, and two interim grey values that are of different shades/tones of grey between black and white.

In various embodiments, the mappings 112 may be generated by, stored by, or at least accessible by the electronic device 102. Moreover, the mappings 112 may associate individual grey values within the first set of grey values 108 to individual grey values within the second set of grey values 114. That is, in order to reduce the number of grey values from sixteen to four, multiple grey values of the first set of grey values 108 may be associated with or mapped to a single grey value of the second set of grey values 14. For instance, assume that the first set of grey values 108 range from grey value 0 to grey value 15, and the second set of grey values 114 range from grey value 1 to grey value 4. Although any mapping may be contemplated, in this scenario, grey values 0-3 of the first set of grey values 108 may be mapped to grey value 1 of the second set of grey values 114, grey values 4-7 of the first set of grey values 108 may be mapped to grey value 2 of the second set of grey values 114, grey values 8-11 of the first set of grey values 108 may be mapped to grey value 3 of the second set of grey values 114, and grey values 12-15 of the first set of grey values 108 may be mapped to grey value 4 of the second set of grey values 114. As a result, if the electronic device 102 were to display various content of the content item 106 in grey value 6 of the first set of grey values 108, the electronic device may determine that grey value 6 maps to grey level 2 of the second set of grey values 114. The electronic device 102 may then display that content using the shade of grey corresponding to grey level 2 of the second set of grey values 114.

Utilizing the mappings 112, the color values 110 may be mapped to the second set of grey values 114 in a similar manner. In certain embodiments, each color value 110 may be mapped to one or more of the grey values of the second set of grey values 114. For instance, each color value 110 (e.g., a red color value 110, a green color value 110, etc.) may be mapped to a corresponding one of the second set of grey values 114, such as grey value 1 through grey value 4 of the second set of grey values 114. Accordingly, when the electronic device 102 is to present a portion of the content item 106 that is of a particular color, which has a specific color value 110, the electronic device 102 may utilize the mapping 112 to identify a particular grey value of the second set of grey values 114 that corresponds to the color value 110. The electronic device 102 may then display that color in the shade of grey associated with that particular grey value.

As a result of determining the second set of grey values 114 from the first set of grey values 108 and/or the color values 110, or as a result of converting the first set of grey values 108 and/or the color values 110 into the second set of grey values 114, the electronic device may increase a page turn time 116. That is, by utilizing a lesser number of grey values to display content items 106 via the display 104, the electronic device 102 may reduce the amount of time it takes to update a page currently being displayed via the display 104, or may reduce the amount of time it takes to transition from a first page of the content item 106 to a second page of the content item 106, which may result in a positive user experience.

For the purposes of this discussion, the display 104 of the electronic device 102 may currently display a first page of the content item 106 using the first set of grey values 108 and/or the color values 110. The electronic device 102 may then display a second page of the content item 106 (e.g., a previous page, a subsequent page, etc.) using the second set of grey values 114 that are determined based at least partly on the mapping(s) 112. Alternatively, or in addition, the electronic device 102 may intend to display a page of the content item 108 using the first set of grey values 108 and/or the color values 110, but may then elect to display the same page of the content item 106 using the second set of grey values 114. As a result, rather than the display 104 presenting the page of the content item 106 using the first set of grey values 108 and/or the color values 110, the page of the content item 106 may instead be displayed using the second set of grey values 114. In this embodiment, the page of the content item 106 may not be presented via the display 104 using the first set of grey values 108 or the color values 110.

Figure 2:
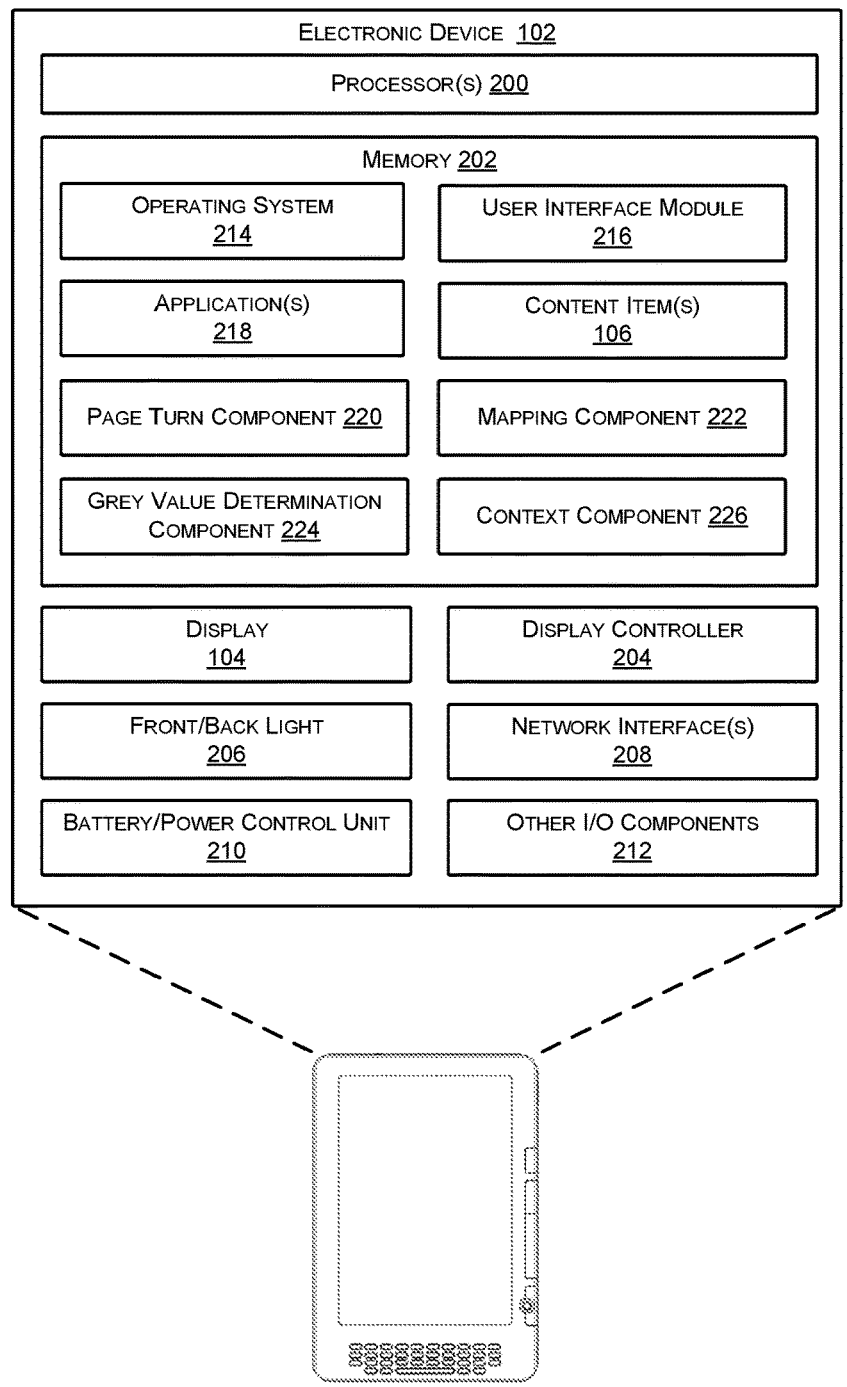
FIG. 2 illustrates example components of an electronic device configured to increase page turn time associated with a content item to be displayed via a display of the electronic device.

FIG. 2 illustrates example components of an electronic device, such as electronic device 102, that is configured to decrease page turn time associated with a content item based on mappings between grey values and/or color values. While FIG. 2 illustrates the electronic device 102 as a dedicated eBook reading device, in other implementations, the electronic device 102 may include any other type of mobile electronic device (e.g., a laptop computer, a tablet computing device, a multifunction communication device, a portable digital assistant (PDA), etc.) or non-mobile electronic device (e.g., a desktop computer, a television, a game console, etc.).

Regardless of the specific implementation of the electronic device 102, the electronic device 102 may include one or more processors 200, memory 202, a display 104, a display controller 204, a front/back light 206, network interface(s) 208, a battery/power control unit 210, and other I/O components. Moreover, the memory 202 of the electronic device 102 may include an operating system 214, a user interface module 216, one or more applications 218, content items 106, a page turn component 220, a mapping component 222, a grey value determination component 224, and a context component 226. Various components associated with the electronic device 102 may also be referred to as modules, and vice versa.

In various embodiments, the processor(s) 200 may execute one or more modules and/or processes to cause the electronic device 102 to perform a variety of functions, as set forth above and explained in further detail in the following disclosure. In some embodiments, the processor(s) 200 may include a central processing unit (CPU), a graphics processing unit (GPU), both CPU and GPU, or other processing units or components known in the art. Additionally, each of the processor(s) 200 may possess its own local memory, which also may store program modules, program data, and/or one or more operating systems. The processor 200 may include multiple processors 200 and/or a single processor 200 having multiple cores.

The memory 202 may include computer-readable storage media ("CRSM"), which may be any available physical media accessible by the processor(s) 200 to execute instructions stored on the memory 202. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 200.

In some instances, the display 104 may represent a type of reflective display, such as an electronic paper display, that displays content based on light reflected from above the display 104. Electronic paper displays may represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display 104.

In one implementation, the display 104 may include an electrophoretic display that moves particles between different positions to achieve different color shades. For instance, in a pixel that is free from a color filter, the pixel may be configured to produce white when the particles within this pixel are located at the front (i.e., viewing) side of the display 104. When situated in this manner, the particles reflect incident light, thus giving the appearance of a white pixel. Conversely, when the particles are pushed near the rear of the display 104, the particles absorb the incident light and, hence, cause the pixel to appear black to a viewing user. In addition, the particle may situate at varying locations between the front and rear sides of the display 104 to produce varying shades of grey. Furthermore, as used herein, a "white" pixel may comprise any shade of white or off white.

In another implementation, the display 104 may include an electrophoretic display that includes oppositely charged light and dark particles. In order to create white, the display controller 204 may move the light particles to the front side of the display 104 by applying a voltage to create a corresponding charge at an electrode near the front and moves the dark particles to the back of the display 104 by creating a corresponding charge at an electrode near the back. In order to create black, meanwhile, the display controller 204 may change the polarities and move the dark particles to the front and the light particles to the back. Furthermore, to create varying shades of grey, the display controller 204 may utilize different arrays of both light and dark particles.

In still another implementation, the display 104 may include an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension may act as an optical switch by contracting a colored oil film when a voltage is applied to individual pixels of the display 104. When the voltage is absent, the colored oil may form a continuous film within a pixel, and the color may thus be visible to a user of the display 104. On the other hand, when the voltage is applied to the pixel, the colored oil may be displaced and the pixel may become transparent. When multiple pixels of the display 104 are independently activated, the display may present a color or greyscale image. The pixels may form the basis for a transmissive, reflective, or transmissive/reflective (transreflective) display 104. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional liquid-crystal displays (LCDs) makes the technology suitable for displaying content on portable devices that rely on battery power.

Of course, while multiple different examples have been given, it is to be appreciated that the displays 104 described herein may comprise any other type of electronic paper technology, such as gyricon displays, electrowetting displays, electrofluidic displays, interferometric modulator displays, cholestric liquid crystal displays, and the like. In addition, while some of the displays 104 described below are discussed as displaying dark (e.g., black), light (e.g., white), and varying shades of grey, it is to be appreciated that the described techniques apply equally to electronic paper displays capable of displaying color pixels.

Furthermore, while the techniques above describe the use of reflective displays and front lights, in some instances the techniques described herein may be used in backlit displays. For instance, the brightness of a backlight in a display may be altered in the same, similar or different ways as described herein with reference to a page-update on a reflective display.

Moreover, the display controller 204 may control the updating of the display 104, as well as controlling a front light/back light 206 of the electronic device 102. The front light 206 may be integrated within the electronic device 102. In these instances, one or more light sources (e.g., light emitting diodes LEDs) may reside around some or all of the display 104, and may be illuminated when desired. A surface of the display 104 may include diffractive gratings (e.g., having a sawtooth cross-sectional profile) that diffracts light received across the surface of the display 104 down onto the display 104. The display 104 may then reflect the light back upwards and away from the display 104, thus illuminating the display 104. In other instances, the front light may detachably couple to the electronic device 102. Of course, while two examples are described herein, electronic devices may implement any other types of lights configured to light a front portion of the display 104 of the electronic device 102.

FIG. 2 further illustrates that the electronic device 102 may include one or more network interfaces 208, one or more battery/power control units 210 that provide power to the electronic device 102, and one or more other input/output components 212. The network interfaces 208 may support both wired and wireless connection to various networks, such as cellular networks, radio, WiFi networks, short range networks (e.g., Bluetooth), IR, and so forth.

As illustrated, the memory 202 may further store an operating system 214, a user interface module 216, one or more applications 218, and one or more content items 106. In some instances, the one or more of the applications 218 may include content presentation applications for presenting the content items 106. For instance, an application 218 may be an eBook reader application for rending textual electronic books, an audio player for playing audio books or songs, a video player for playing video, and so forth. Moreover, the content items 106 may include any type of content, such as eBooks, audio books, songs, videos, still images, and the like.

As shown in FIG. 2, the memory 202 may include a page turn component 220 that causes the display 104 of the electronic device 102 to update pages of a content item 106, and/or causes the display 104 to present a different page (e.g., a subsequent page, a prior page, etc.) of the content item 106. That is, the page turn component may refresh a page currently being displayed via the display 104, possibly in response to the user requesting that the page be refreshed or updated. Moreover, the user may perform some action (e.g., pressing a button, interacting with a touch-sensitive interface, uttering a voice command, etc.) indicating an intent to transition from the page of the content item 106 currently being displayed to a different page. That is, the user may request that the next page, or a previous page, of the content item 106 be displayed. In response, the page turn component 220 may turn the page of the content item 106 such that a different page is presented via the display 104.

In addition, the mapping component 222 may map, associate, correlate, etc., a first set of grey values 108 and/or a set of color values 110 to/with a second set of grey values 114. That is, provided that the content item 106 could be displayed utilizing sixteen grey values, but that the page turn time 116 will be reduced if the content item 106 is displayed utilizing a lesser amount of grey values, such as four grey values, the mapping component 222 may map the set of sixteen grey values to individual ones of the set of four grey values. That is, since the number of grey values is being reduced, possibly from sixteen grey values to four grey values, the mapping component 222 performs the mapping 112 so that each grey value of the first set of grey values 108 is mapped to (or is associated with) a particular grey value of the second set of grey values 114. Furthermore, provided that the content item 106 includes content (e.g., pixels)

having various colors, the mapping component 222 may map color values 110 associated with the colors to individual ones of the four grey values.

Provided that the content item 106 is to be presented via the display 104 utilizing a particular number of grey values, the grey value determination component 224 may leverage the mappings 112 to determine which grey values to use. More particularly, the grey value determination component 224 may determine that a particular portion of the content item 106 (e.g., one or more pixels) is associated with a shade of grey corresponding to a first grey value of the first set of grey values 108. However, the electronic device 102 is to display that portion of the content item 106 (e.g., the one or more pixels) using the second set of grey values. From the mapping 112, the grey value determination component 224 may determine a second grey value from the second set of grey values 114 that is mapped to the first grey value. As a result, the electronic device 102 may display the portion of the content item 106 (e.g., the one or more pixels) in the shade of grey that corresponds to the second grey value. The grey value determination component 224 can perform this mapping/conversion for other pixels of the content item 106 such that the content item 106 is displayed using the appropriate grey values of the second set of grey values 114.

In additional embodiments, the context component 226 may determine the context of content items 106 to be displayed via the display 104 of the electronic device 102. In particular, the context component 226 may determine a type of content included on a page of the content item 106 being displayed via the display 104 of the electronic device 102 and/or may distinguish between different types of content included on a single page of the content item 106, or on multiple pages of the content item 106. For instance, the context component 226 may determine that a page of the content item 106 includes text, and only text. The context component 226 may additionally determine that different types of content, such as text, a flat image, and/or a complex image, is included within a single page of the content item 106. The context component 226 may also determine that different pages of the content item 106 includes different types of content, such that a first page includes text, a second page includes one or more images, and so on. As a result, the context component 226 may enable the electronic device 102 to display the different types of content using the appropriate grey value, and to possibly use different mappings 112 for the different types of content. For the purposes of this discussion, the term "image" may include any type of content that does not constitute text, such as pictures, symbols, icons, drawings, and other graphics.

As stated above, the electronic device 102 may convert first grey values of a first set of grey values 108 (sixteen grey values) into second grey values of a second set of grey values 114 (four grey values). To convert the first grey values into the second grey values, the electronic device 102 may generate, or otherwise utilize, a mapping 112 between the first set of grey values 108 and the second set of grey values 114. The mapping 112 may associate the first grey values to the second grey values such that the electronic device 102 can display pixels of the content item 106 in the appropriate grey values. For instance, provided that certain pixels of the content item 106 are to be displayed is a shade of grey corresponding to grey value 11 of the first set of grey values 108, and assuming that grey value 11 is mapped to grey value 3 of the second set of grey values 114, those pixels will then be displayed in a shade of grey corresponding to grey value 3. In particular, the display controller 204 may receive an indication of the appropriate grey value to display (i.e., grey value 3) and then provide the appropriate grey value to the display 104 for presentation.

In certain embodiments, the electronic device 102 may be associated with one or more framebuffers and/or waveforms that are used to cause the display 102 to display content items 106 in various grey values. For the purposes of this discussion, a framebuffer may correspond to memory that is configured to store content that corresponds to a page of the content item 106 that is to be displayed via the display 104 of the electronic device 102 (e.g., a subsequent page, a previous page, etc.). For instance, provided that a first page of the content item 106 is being displayed via the display 104, the framebuffer may store content associated with a second page of the content item 106 that is to be displayed after the first page.

Moreover, a waveform may serve as a page refresh mechanism that allows the display 104 of the electronic device 102 to transition between different pages of a content item 106. In particular, the waveform may determine (e.g., such as via an algorithm) which content to present via the display 104 and may cause pixels to display specific grey/color values that correspond to the page that is to be displayed. Accordingly, the waveform may allow the display 104 of the electronic device 102 to transition between a first page of the content item 106, which may be displayed using a first set of grey values (e.g., sixteen grey values), to a second page of the content item 106, which may be displayed using a second set of grey values (e.g., four grey values). That is, one or more waveforms may instruct pixels of the display 104 to present specific content (e.g., text, images, etc.), and how to transition between grey/color values, and one or more framebuffers may store the content that relates to the content to be displayed.

More particularly, the display controller 204, which may be an electrophoretic display controller (EPDC), may convert grey values determined by a framebuffer and decide which waveform to utilize in order to send the appropriate grey values to the display 104 for presentation. In some instances, a content item 106 may consist of pixels having various colors that are to be displayed in various shades of grey. As a result, the color values (also referred to as RGB values) may be mapped and converted to grey values, which can be used by the electronic device 102 to display the content item 106 in one or more shades of grey. That is, the electronic device 102 may map/convert specific color values to specific grey values.

Therefore, each color value associated with a particular color may be mapped to a particular grey value, and multiple color values may be mapped to the same grey value. The electronic device 102 may generate, maintain, or at least have access to a mapping 112 that maps the color values to appropriate grey values. As a result, provided that the electronic device 102 has access to this mapping 112, and provided that the electronic device 102 knows the color value of a particular pixel, then the electronic device 102 may be able to use the mapping 112 to determine the grey value that corresponds to the color value and to output that grey value via the display 104. For instance, assume that a red pixel associated with a page of the content item 106 has a color value of 255.00. The mapping 112 may associate/correspond this color value to grey value 4. Upon determining that the color value (255.00) is mapped to grey value 4, the output on the display 104 of the electronic device 102 is a grey pixel having a shade/illuminance corresponding to grey level 4.

In certain embodiments, the electronic device 102 may generate, maintain, or at least have access to, multiple mappings 112 that are used to present content items 106 via the display 104. Moreover, in some instances, the electronic device 102 may adjust the mappings 112 and/or may select different mappings 112 in order to vary the presentation of the content items 106 via the display 104. For instance, assume that sixteen grey values are currently being used to display content items 106, and that a particular color value associated with a content item 106 is mapped to one of the sixteen grey values (e.g., grey value 6). However, it may be determined that the electronic device 102 is to subsequently display content items 104 utilizing four grey values instead of sixteen grey values. The color value may then have to be mapped to one of the four grey values. As a result, the electronic device 102 may generate or utilize a different mapping 112 to map the color value to one of the four grey values (e.g., grey value 2). The display controller 204 may subsequently use the different mapping to display the color value in a shade of grey associated with grey value 2.

As stated above, the context component 226 may determine a type of content of the content item 106 (e.g., the context) to be displayed by the electronic device 102. That is, the context component 226 may identify and differentiate between text, images, different types of images (e.g., flat images, complex images, etc.), and so on. The electronic device 102 may possess logic that can differentiate between text and images. Moreover, the electronic device 102 may also utilize various heuristics for distinguishing between different types of images, such as more and less complex images. Since the context component 226 is configured to be aware of the context with respect to a page of the content item 106, the electronic device 102 may apply the appropriate mappings 112, select the appropriate waveform(s), and use the appropriate grey values to display the content item 106. The electronic device 102 may then use different mappings and grey values for different types of content included within the content item 106.

As an illustrative example, a particular page of a content item 106 may include different types of content (e.g., text and an image), or each of multiple pages of the content item 106 may include different types of content. For instance, a first page of the content item 106 may include text, a second page of the content item 106 may include a flat image, and a third page of the content item 106 may include a more complex image. To cause the content item 106 to be aesthetically pleasing to the user, the electronic device 102 may use different mappings 112 for the different types of content. The electronic device 102 may use a set of sixteen grey values for the complex image, but use a set of four grey values for each of the text and the flat image. However, the four grey values used to display the text and the flat image may differ. The electronic device 102 may select a first set of four grey values of the sixteen grey values (grey levels 0, 3, 13, and 15) for the text, and select a second set of four grey values of the sixteen grey values (e.g., 0, 5, 10, and 15) for the flat image. That way, although both the text and the flat image will be displayed using four grey values, using different sets of grey values may cause the appearance of the text and the flat image to differ.

In additional embodiments, various waveforms may be utilized to present content items 106 via the display 104. For the purposes of this discussion, a waveform may be associated with hardware and/or software of the electronic device 102, and may be associated with a particular grey value or mapping 112. In some embodiments, a waveform may receive as input a particular grey value associated with a content item 106, and then cause the display 104 to output the content item 106 using that grey value or a different grey value generated using one or more of the mappings 112. There may be multiple types of waveforms, such as waveforms that cause the display 104 to output either black or white, waveforms for a particular grey value, and/or waveforms for a set of grey values. For instance, for a waveform that only outputs black/white content, the waveform may receive as input various grey values, but may cause the display 104 to output content in either black or white. In particular, the waveform may receive as input any grey value included in the sixteen grey values, and may output a black or white value. In this embodiment, half of the sixteen grey values (grey values 0 to 7) may be mapped to white, whereas the other half of the sixteen grey values (grey values 8 to 15) may be mapped to white. As a result, first content (e.g., first pixels) associated with grey value 4 may be output as white and second content (e.g., second pixels) associated with grey value 14 may be output as black.

A particular waveform may also dynamically determine an appropriate mapping 112 based on the input that is received. More particularly, based on the type of input received (e.g., four grey values, sixteen grey values, etc.), the waveform may generate, maintain, and/or access a mapping 112 such that the output provided by the waveform is consistent with the capabilities/configuration of the waveform. Some waveforms are limited with respect to the color/grey values that they can output (e.g., black/white, a particular grey value, a set of grey values, etc.). Therefore, based on the input received, the waveform may select a mapping 112 that will allow the waveform to output values that the waveform is configured to output. For instance, if the input is a grey value included within a first set of grey values 108 (e.g., sixteen grey values), the waveform may select a mapping 112 that allows the waveform to map the grey value to a black/white value or a grey value included within a second set of grey values 114 (e.g., four grey values).

In certain embodiments, one or more of a framebuffer, the display controller 204, and a waveform may convert a color value (e.g., an RGB value) into a grey value that corresponds to a shade of grey that is to be output via the display 104. In particular, a content item 106 that is to be presented via the display 104 may be include colored text, images, etc., but the electronic device 102 may only be configured to present the content item 106 in various shades of grey. Accordingly, the electronic device 102 may have to determine how to convert color values associated with the content item 106 to grey values. Initially, the content having the color value(s) may be provided to the framebuffer, which stores the content/color values.

The display controller 204 may then access one or more mappings 112 that are used to convert the color value(s) to corresponding grey values. In particular, the display controller 204 may access a mapping 112 that maps each color value associated with the content (e.g., pixels of the content item 106) to a particular grey value associated with a set of grey values (e.g., four grey values, sixteen grey values, etc.). Provided that the color values are mapped and/or converted to grey values of the four grey values, the display 104 may present the content in shades of grey corresponding to such grey values. However, if the color values are mapped to grey values associated with sixteen grey values, the grey values may serve as input for a particular waveform. Using one or more mappings 112, the waveform may map the grey values associated with the sixteen grey values to grey values associated with the four grey values such that the content may be displayed in shades of grey corresponding to the four grey values.

Accordingly, the number of grey values used to display content items 106 via the display 104 of the electronic device corresponds to the different shades of grey in which the content items 106 are displayed. For instance, if sixteen grey values are used, the content may be displayed in black, white, and fourteen interim shades of grey between black and white. Therefore, since a significant number of shades of grey are utilized to display content items 106, the electronic device 102 is able to display the content items 106 with greater contrast/detail. Moreover, if four grey values are used, the content may be displayed in black, white, and two interim shades of grey between black and white. Since only two interim shades of grey are used to display content items 106 in the four grey value context, the electronic device 102 may display pages of the content items 106 at a faster rate (e.g., the electronic device 102 need only to select among black, white, and two grey values), which may result in a reduced page turn time 116 and a more positive experience for the user of the electronic device 102.

As a result of using a reduced number of grey values in the four grey value context, the quality of the images presented via the display 104 may be reduced. To remedy the perception of reduced quality of images, the electronic device 102 may use one or more techniques, such as dithering, obfuscation, etc. For instance, the electronic device 102 may perform dithering in association with displaying the content items 104 using four grey values. Instead of rendering a plurality of grey pixels into randomized black and white pixels, the electronic device 102 may render pixels associated with the content item 106 into black, white, and grey pixels either having a first grey value or a second grey value.

In some instances, the electronic device 102 may have features or functionality in addition to those that FIG. 2 illustrates. For example, the electronic device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the electronic device 102 may reside remotely from the electronic device 102 in some implementations. In these implementations, the electronic device 102 may utilize the network interfaces 208 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 3A:
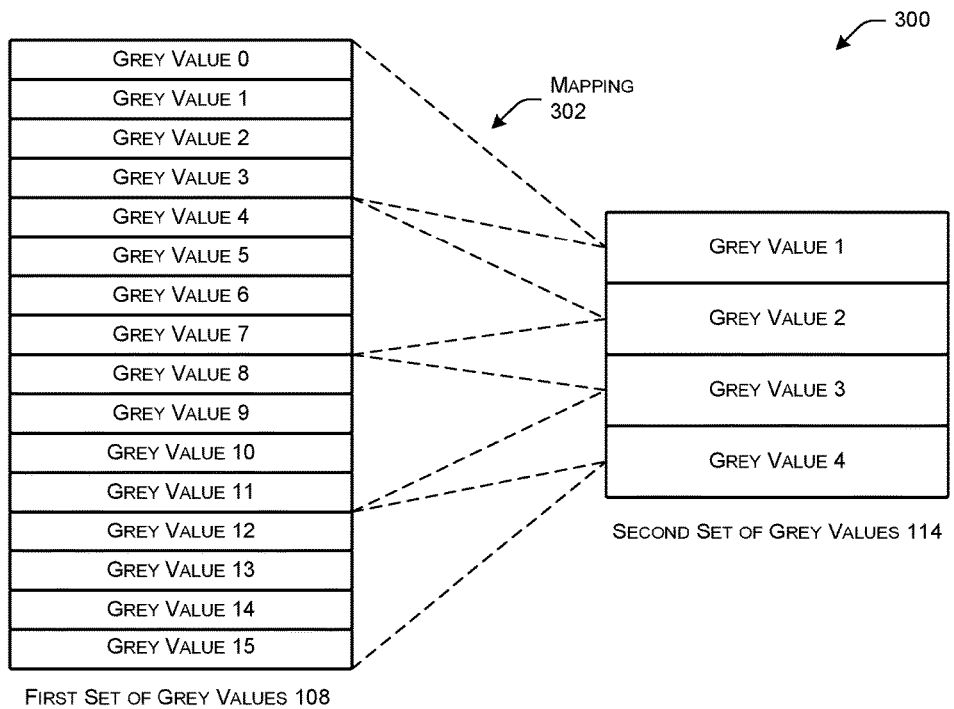
FIG. 3A illustrates an example diagram of a mapping between a first set of grey values and a second set of grey values.

FIG. 3A illustrates a diagram 300 of an example mapping between different sets of grey values/levels, as discussed above with respect to FIGS. 1 and 2. More particularly, FIG. 3A illustrates a first set of grey values/levels 108 that are mapped to a second set of grey values/levels 114 via a mapping 302. For the purposes of FIG. 3A, although the first set of grey values 108 and/or the second set of grey values 14 may include any number of grey values, the first set of grey values 108 may correspond to a set of sixteen grey values (e.g., grey value 1 to grey value 15) that are mapped to a set of four grey values (e.g., grey value 1 to grey value 4), which constitute the second set of grey values 114.

As illustrated in FIG. 3A, each of the second set of grey values 108 may be mapped to a particular grey value of the second set of grey values 114. For instance, grey values 0-3 of the first set of grey values 108 are mapped to grey value 1 of the second set of grey values 114, grey values 4-7 of the first set of grey values 108 are mapped to grey value 2 of the second set of grey values 114, grey values 8-11 of the first set of grey values 108 are mapped to grey value 3 of the second set of grey values 114, and grey values 12-15 of the first set of grey values 108 are mapped to grey value 4 of the second set of grey values 114. Since the first set of grey values 108 includes a first number of grey values (i.e., sixteen grey values) that is greater than a second number of grey values (i.e., four grey values) included in the second set of grey values 114, multiple ones of the first set of grey values 108 may be mapped to a single one of the second set of grey values 114. That is multiple grey values of the first set of grey values 108 (e.g., grey value 0, grey value 1, grey value 2, and grey value 3) may be mapped to or associated with a single grey value of the second set of grey values 114 (e.g., grey value 1).

Accordingly, when converting a grey value of the first set of grey values 108 into a grey value of the second set of grey values 114, the electronic device 102 may do so by generating, maintaining, and/or accessing the mapping 302 illustrated in FIG. 3A. That is, if a page of a content item includes pixels having a shade of grey corresponding to grey value 5 of the first set of grey values 108, and if the page of the content item 106 is to be displayed using the second set of grey values 114 (e.g., four grey values), grey value 5 of the first set of grey values 108 may be mapped to grey value 2 of the second set of grey values 114. The pixels included in the page of the content item 106 may then be displayed in a shade of grey corresponding to grey value 2 of the second set of grey values 114.

In certain embodiments, some or all of the grey values (e.g., grey values 1-4) included within the second set of grey values 114 may be selected from the first set of grey values 108. For instance, with respect to the second set of grey values 114, grey value 1 may be white, grey value 4 may be black, and grey value 2 and grey value 3 may be interim shades of grey between white and black. Instead of individual grey values being black and/or white, grey values 1 through 4 of the second set of grey values 114 may also each correspond to different shades of grey. Therefore, each of grey values 1-4 of the second set of grey values 114 may be black, white, or any interim shade of grey between black and white.

Moreover, to determine grey values 1-4 of the second set of grey values 114, the electronic device 102 (or another entity, such as remote computing resources) may select individual grey values of the first set of grey values 108 to constitute grey values 1-4 of the second set of grey values 114. For instance, grey values 1, 2, 3, and 4 of the second set of grey values 114 may correspond to grey values 0, 4, 11, and 15, respectively, of the first set of grey values 108. However, it is contemplated that any set of grey values of the first set of grey values 108 (e.g., grey values 0, 2, 13, and 15, or grey values 0, 6, 9, and 15, etc.) may be selected as the second set of grey values 114. The determination of which grey values to include as the second set of grey values 114 may be based on the type of content (e.g., text, flat images, complex images, etc.) that are to be displayed via the display 104 of the electronic device 102. As a result, the different shades of grey corresponding to the second set of grey values 114 may be a subset of the different shades of grey of the first set of grey values 108. Moreover, these mappings 302 may be generated, maintained, accessed, and/or modified/updated by the electronic device 102.

In some embodiments, the electronic device 102 may store pre-determined sets of grey values that each correspond to a different type of content. For instance, different types of font (e.g., Times New Roman, Calibri, etc.) or different types of images (e.g., a flat image, a complex image, etc.) may each be associated with different sets of grey values (e.g., four grey values). Using font as an example, the font Times New Roman may be associated with a first set of four grey values (e.g., grey values 0, 3, 7, and 14) and the font Calibri may be associated with a second, different set of four grey values (e.g., grey values 0, 6, 8, and 12). Such grey values may be selected from a larger set of grey values, such a set of sixteen grey values. Moreover, the pre-determined grey values that are associated with different types of fonts, images, etc., may allow for the content to be presented in an aesthetically pleasing manner to the user (e.g., higher resolution, better contrast, etc.). When it is determined that a particular font of text is include in a page of the content item 106 that is to be displayed, the electronic device may display that text using the pre-determined set of grey values that is associated with that type of font.

Figure 3B:
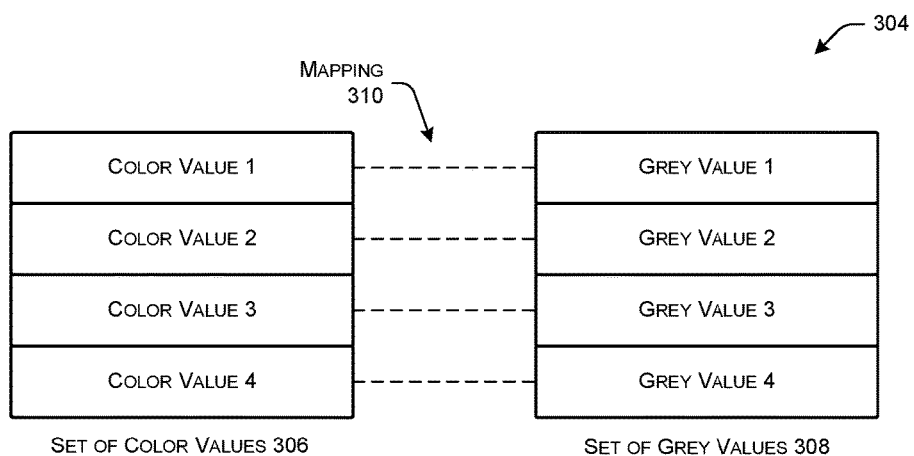
FIG. 3B illustrates an example diagram of a mapping between a set of color values and a set of grey values.

FIG. 3B illustrates a diagram 304 of an example mapping between a set of color values and a set of grey values, as discussed above with respect to FIGS. 1 and 2. As shown, FIG. 3B illustrates a set of color values 306, a set of grey values 308 and a mapping 310 between the set of color values 306 and the set of grey values 308. The color values included in the set of color values 306 (e.g., color value 1, color value 2, color value 3, and color value 4) may represent RGB values associated with colored pixels of content (e.g., a page, an image, text, etc.) of a content item 106 (e.g., an eBook). In some embodiments, the electronic device 102 may not be configured to display color and, as a result, the electronic device 102 may map, associate, and/or convert the color values to grey values that correspond to various shades of grey.

The mapping 310 indicates that each color value of the set of color values 306 is mapped to a particular grey value of the set of grey values 308. Although four grey values are shown, it is contemplated that the set of grey values 308 may include any number of grey values (e.g., sixteen grey values). As shown by the mapping 310, color value 1 is mapped to grey value 1, color value 2 is mapped to grey value 2, color value 3 is mapped to grey value 3, and color value 4 is mapped to grey value 4. Therefore, when it is determined that a content item 106 includes portions that contain colored pixels, the electronic device 102 may convert the color values associated with those colored pixels to corresponding grey values, which may cause the pixels to be displayed in various shades of grey that correspond to the grey values. For instance, if it is determined that a pixel associated with a content item 106 is of color value 2, then the electronic device 102 may determine that color value 2 is mapped to grey value 2, and pixel may be output via the display 104 in a shade of grey corresponding to grey value 2.

Figure 4:
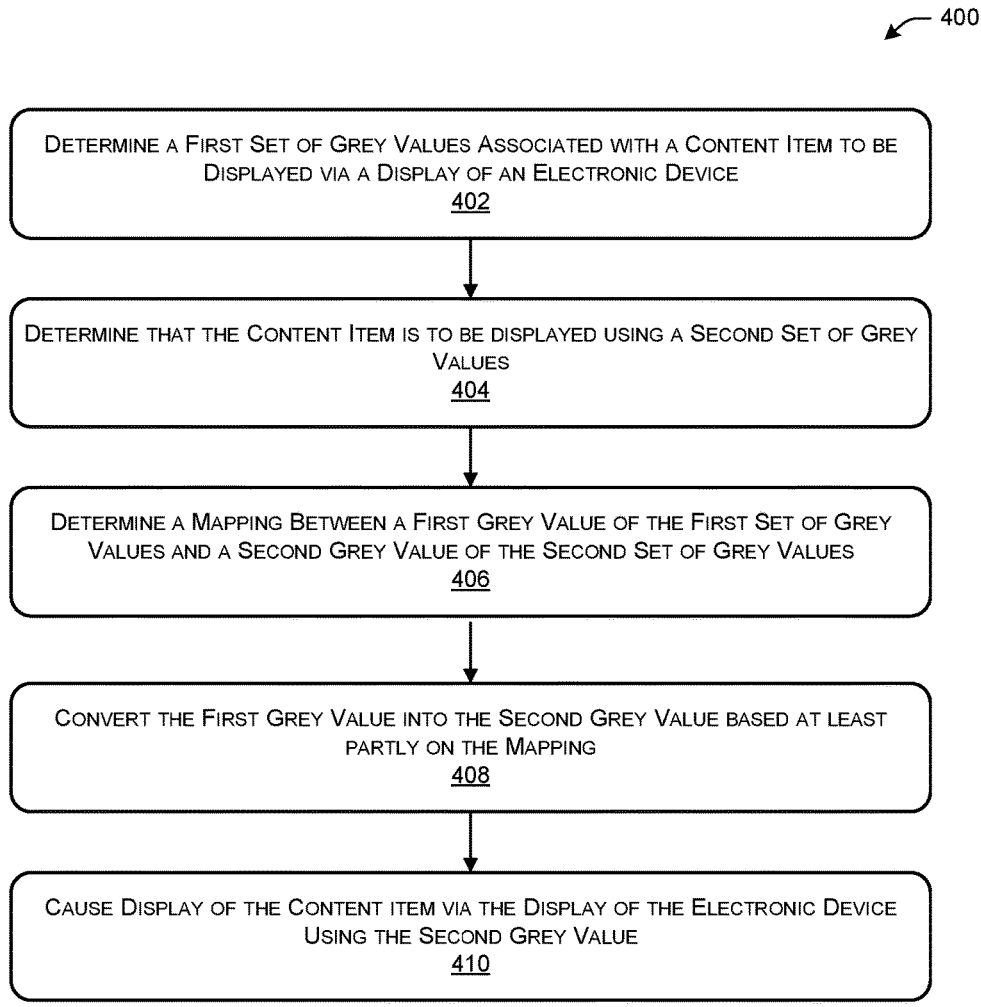
FIG. 4 illustrates an example flow diagram for displaying a content item via a display of an electronic device based on a mapping of a first set of grey values to a second set of grey values.
Figure 5:
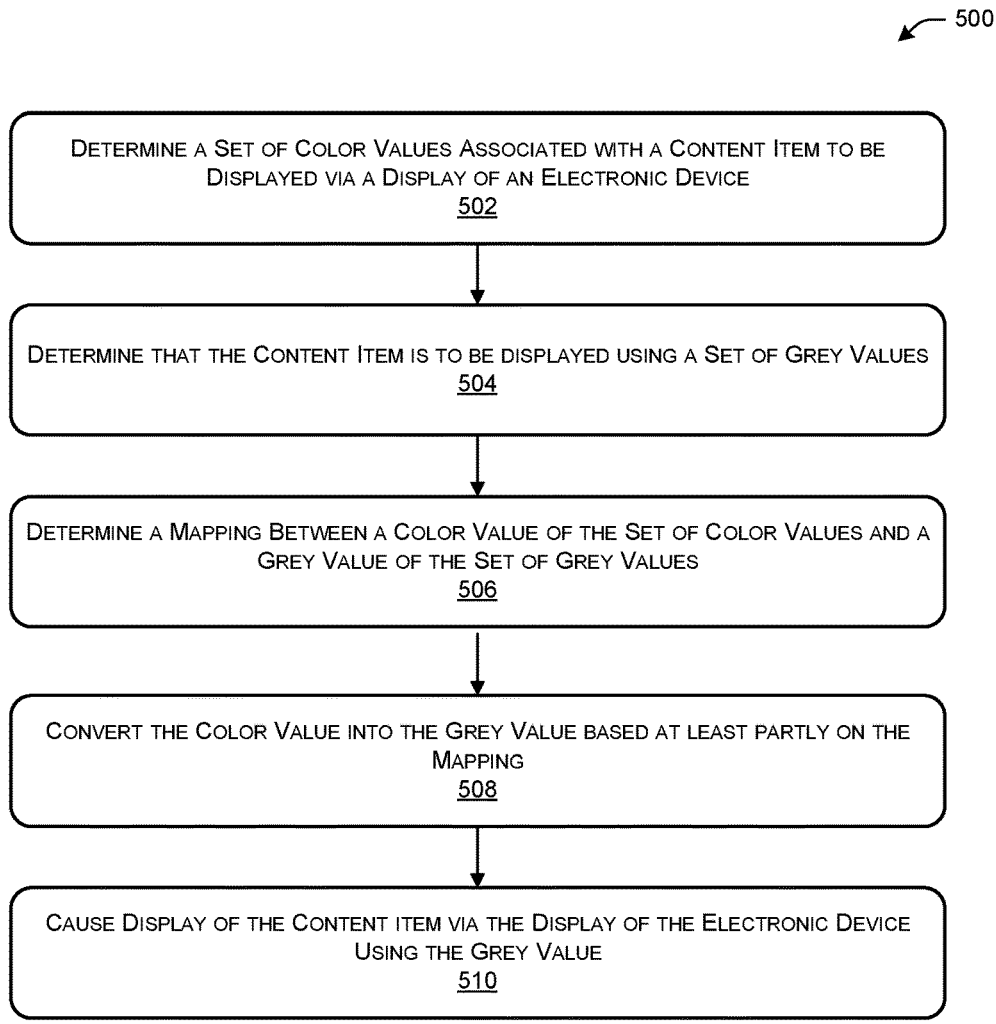
FIG. 5 illustrates an example flow diagram for displaying a content item via a display of an electronic device based on a mapping of a set of color values to a set of grey values.
Figure 6:
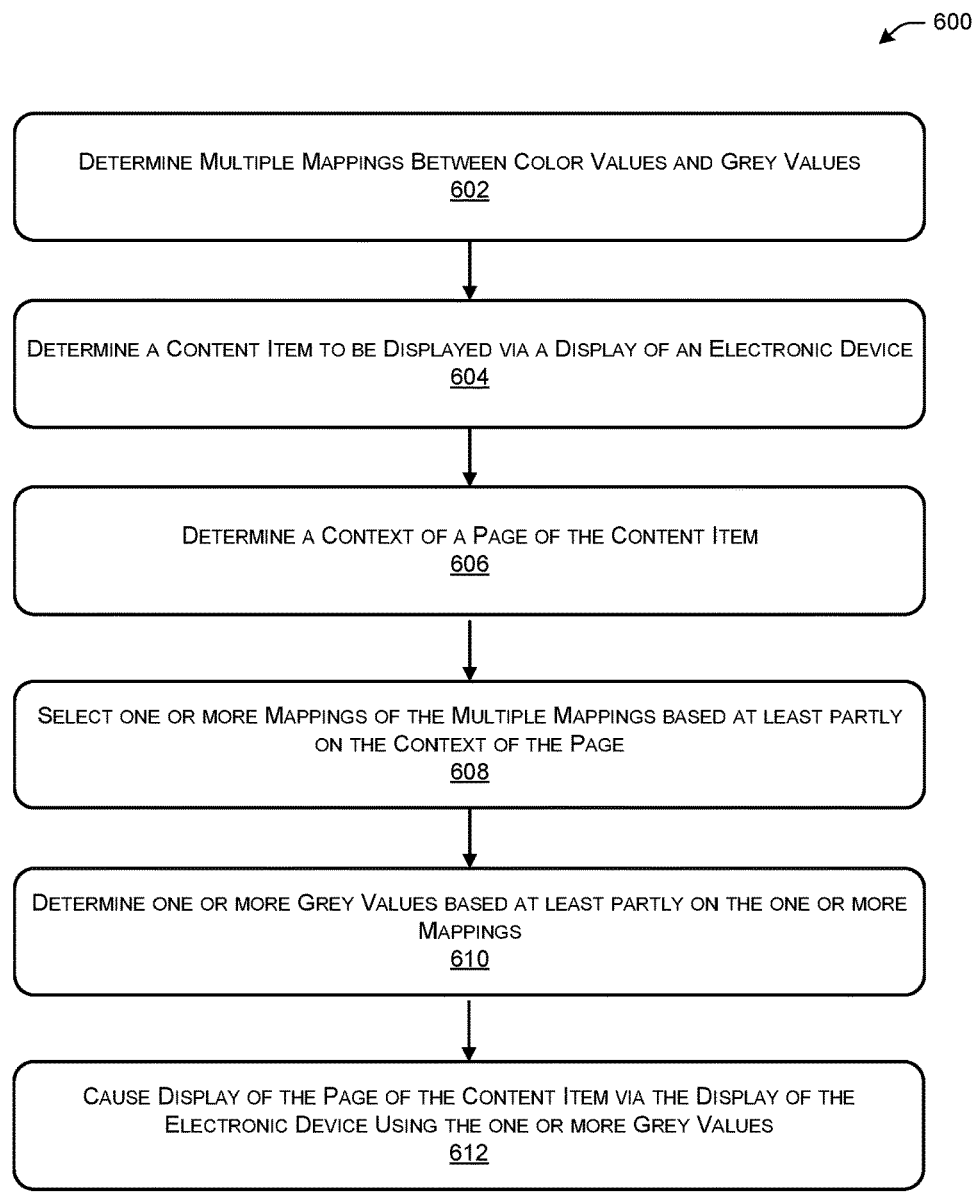
FIG. 6 illustrates an example flow diagram for displaying a content item via a display of an electronic device based on a context of a content item.

FIGS. 4-6 illustrate example processes of mapping a first set of grey values and/or a set of color values associated with a content item to a second set of grey values. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates a flow diagram of an example process 400 of mapping a first set of grey values associated with a content item to a second set of grey values. Moreover, the following actions described with respect to FIG. 4 may be performed by an electronic device, such as electronic device 102, and/or a server communicatively coupled to the electronic device 102.

Block 402 illustrates determining a first set of grey values associated with a content item to be displayed via a display of an electronic device. In particular, the electronic device 102 (e.g., an eBook reader device) may render and display a content item 106 via a display 104, where one or more pixels of the content item 106 can be displayed in shades of grey corresponding to a first set of grey values 108. In some embodiments, the first set of grey values 108 may correspond to a set of sixteen grey values, which may include black, white, and fourteen interim grey values in between black and white.

Block 404 illustrates determining that the content item is to be displayed using a second set of grey values. In order to decrease a page turn time associated with transitioning between pages of the content item 106 displayed via the display 104 of the electronic device 102 (e.g., turning from a first page to a second page), the electronic device 102 may elect to display the content item 106 using a second set of grey values 114, where the first set of grey values 108 may correspond to a set of sixteen grey values and the second set of grey values 114 may correspond to a set of four grey values (e.g., black, white, and two interim grey values between black and white).

Block 406 illustrates determining a mapping between a first grey value of the first set of grey values and a second grey value of the second set of grey values. More particularly, the electronic device 102 may generate, maintain, or at least have access to one or more mappings 112 that map or associate grey values of the first set of grey values 108 to grey values of the second set of grey values 114. As a result, when content/pixels that corresponds to a first grey value of a first set of grey values is to be displayed in a second set of grey values, the electronic device 102 may determine a second grey value that corresponds to the first grey value.

Block 408 illustrates converting the first grey value into the second grey value based at least partly on the mapping. Utilizing the mapping 112, the electronic device 102 may determine a second grey value that is mapped to the first grey value. In some embodiments, the electronic device 102 may determine that a page of the content item 106 to be presented is to be displayed using a particular set of grey values (e.g., four grey values). If a currently displayed page of the content item 106 is being displayed using a different set of grey values (e.g., sixteen grey values), or if the page to be displayed is initially going to be presented using the different set of grey values, the electronic device 102 may perform a mapping to determine which grey values are to be used to display the page. These grey values may then be stored by the electronic device 102. In other embodiments, if a page is initially to be displayed using a first set of grey values (e.g., sixteen grey values), but it is determined that the page will be displayed using a second set of grey values (e.g., four grey values), the electronic device 102 may perform a mapping to determine which grey values of the second set of grey values are to be used to display the content associated with the page. These grey values may be used to display the page without necessarily storing the grey values in memory of the electronic device 102.

Block 410 illustrates causing display of the content item via the display of the electronic device using the second grey value. Upon determining the second grey value, the electronic device 102 may display the content item 106 in the shade of grey corresponding to the second grey value. For instance, the electronic device 102 may display pages of the content item 106 using a set of four grey values, as opposed to using a set of sixteen grey values, which may increase the rate at which the electronic device 102 can transition between pages of the content item 106 (e.g., increase the page turn time).

FIG. 5 illustrates a flow diagram of an example process 500 of mapping a set of color values associated with a content item to a set of grey values. Moreover, the following actions described with respect to FIG. 5 may be performed by an electronic device, such as electronic device 102, and/or a server communicatively coupled to the electronic device 102.

Block 502 illustrates determining a set of color values associated with a content item to be displayed via a display of an electronic device. In certain embodiments, the electronic device 102 (e.g., an eBook reader device) may render and display a content item 106 via a display 104, where the content item 106 can be displayed in one or more colors corresponding to a set of color values. The color values may correspond to an RGB value that is representative of the color of a pixel associated with the content item 106.

Block 504 illustrates determining that the content item is to be displayed using a set of grey values. In order to increase a page turn time associated with transitioning between pages of the content item 106 displayed via the display 104 of the electronic device 102 (e.g., turning from a first page to a second page), the electronic device 102 may elect to display the content item 106 using a set of grey values, where the set of grey values 108 may correspond to a set of sixteen grey values or a set of four grey values Block 506 illustrates determining a mapping between a color value of the set of color values and a grey value of the set of grey values. In some embodiments, the electronic device 102 may generate, maintain, or at least have access to one or more mappings 112 that map or associate color values of the set of color values to grey values of the set of grey values. Each color value may be associated with a particular grey value. As a result, when content/pixels that correspond to a color value of the set of color values is to be displayed using a set of grey values, the electronic device 102 may determine a grey value that corresponds to the color value.

Block 508 illustrates converting the color value into the grey value based at least partly on the mapping. Utilizing the mapping 112, the electronic device 102 may determine a grey value that is mapped to the color value.

Block 510 illustrates causing display of the content item via the display of the electronic device using the grey value. Upon determining the grey value, the electronic device 102 may display the content item 106 in the shade of grey corresponding to the grey value. For instance, the electronic device 102 may display pages of the content item 106 using a set of four grey values, as opposed to using a set of color values, which may increase the rate at which the electronic device 102 can transition between pages of the content item 106 (e.g., increase the page turn time).

FIG. 6 illustrates a flow diagram of an example process 600 of displaying a content item based on a context of the content item. Moreover, the following actions described with respect to FIG. 6 may be performed by an electronic device, such as electronic device 102, and/or a server communicatively coupled to the electronic device 102.

Block 602 illustrates determining multiple mappings between color values and grey values. In various embodiments, the electronic device 102 may generate, maintain, and/or have access to mappings 112 that associate specific color values with specific grey values.

Block 604 illustrates determining a content item to be displayed via a display of an electronic device 102. In particular, the electronic device 102 may present a content item 106 for presentation via the display 104, possibly in response to a request by a user of the electronic device 102.

Block 606 illustrates determining a context of a page of the content item. In various embodiments, the electronic device 102 may distinguish between different types of content included on a page of the content item 106, which may include text, a flat image, a more complex image, and so on. The electronic device 102 may determine that a single page includes a single type of content (e.g., text) or multiple types of content (e.g., text and images), or that different pages of the content item 106 each include different types of content.

Block 608 illustrates selecting one or more mappings of the multiple mappings based at least partly on the context of the page. More particularly, based at least partly on the type of content included on the page of the content item 106 (e.g., text, images, etc.), the electronic device 102 may select a mapping 112 that causes the various types of content to displayed using the appropriate shades of grey. For instance, the electronic device 102 may select different mappings 112 that cause a first type of content (e.g., text) to be displayed using a first set of grey values (e.g., four grey values) and that cause a second type of content (e.g., an image) to be displayed using a second set of grey values (e.g., sixteen grey values).

Block 610 illustrates determining one or more grey values based at least partly on the one or more mappings. In certain embodiments, upon selecting a particular mapping 112, the electronic device 102 may utilize the mapping to determine one or more grey values, where the one or more grey values correspond to different shades of grey.

Block 612 illustrates causing display of the page of the content item via the display of the electronic device using the one or more grey values. More particularly, the different types of content may be displayed via the display 104 using the same or different sets of grey values.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   determining a mapping between a first set of color values or a first set of grey scale values and a second set of grey scale values;
   determining that a pixel corresponds to a first color value of the first set of color values or a first grey scale value of the first set of grey scale values;
   determining a context associated with the pixel; and
   causing, based at least in part on the mapping, the context, and at least one of a framebuffer, a waveform, or a display controller associated with an electronic device that causes display of the pixel, display of the pixel in a shade of grey corresponding to a second grey scale value of the second set of grey scale values, the framebuffer storing content and the waveform causing the content to be displayed via a display of the electronic device.

2. The method as recited in claim 1, wherein determining the context comprises determining that the pixel corresponds to at least one of a portion of text or a portion of an image.

3. The method as recited in claim 1, wherein the first set of grey scale values includes sixteen grey scale values and the second set of grey scale includes four grey scale values.

4. The method as recited in claim 3, wherein the four grey scale values include a grey scale value corresponding to black, a grey scale value corresponding to white, a grey scale value corresponding to a first shade of grey, and a grey scale value corresponding to a second shade of grey.

5. The method as recited in claim 3, wherein the mapping includes at least one of:
   a first mapping that maps each grey scale value of the sixteen grey scale values to one of the four grey scale values; or
   a second mapping that maps each color value of the set of color values to one of the four grey scale values.

6. The method as recited in claim 1, wherein determining the context comprises determining that the pixel corresponds to text, and further comprising:
   determining a first pre-determined set of grey scale values that corresponds to a first font of text;
   determining a second pre-determined set of grey scale values that corresponds to a second font of text that is different from the first font of text;
   determining that the pixel is associated with the first font of text; and
   selecting the first pre-determined set of grey scale values as the second set of grey scale values.

7. The method as recited in claim 1, wherein determining the context comprises determining that the pixel corresponds to an image, and further comprising:
   determining a first pre-determined set of grey scale values that corresponds to a first type of image;
   determining a second pre-determined set of grey scale values that corresponds to a second type of image that is different from the first type of image;
   determining that the pixel is associated with the first type of image; and
   selecting the first pre-determined set of grey scale values as the second set of grey scale values.

8. The method as recited in claim 1, wherein determining the context comprises determining that the pixel corresponds to at least one of a type of text or a type of an image.

9. The method as recited in claim 1, wherein the display controller updates the display of the electronic device to cause presentation of the page of the content item via the display of the electronic device.

10. A method comprising:
    determining that a pixel corresponds to a first color value of a set of color values or a first grey scale value of a first set of grey scale values;
    determining a context associated with the pixel, the context indicating that the pixel corresponds to at least one of a portion of text or a portion of an image;
    determining a mapping between the set of color values or the first set of grey scale values and a second set of grey scale values, the mapping including at least one of a first mapping that maps individual grey scale values of the first set of grey scale values to ones of the second set of grey scale values or a second mapping that maps individual color values of the set of color values to ones of the second set of grey scale values; and
    causing, based at least in part on the context, the mapping, and at least one of a framebuffer, a waveform, or a display controller associated with an electronic device that causes display of the pixel, display of the pixel in a shade of grey corresponding to a second grey scale value of a second set of grey scale values.

11. The method as recited in claim 10, wherein determining the context comprises determining that the pixel corresponds to text, and further comprising:
    determining a first pre-determined set of grey scale values that corresponds to a first font of text;
    determining a second pre-determined set of grey scale values that corresponds to a second font of text that is different from the first font of text;
    determining that the pixel is associated with the first font of text; and
    selecting the first pre-determined set of grey scale values as the second set of grey scale values.

12. The method as recited in claim 10, wherein determining the context comprises determining that the pixel corresponds to an image, and further comprising:
    determining a first pre-determined set of grey scale values that corresponds to a first type of image;
    determining a second pre-determined set of grey scale values that corresponds to a second type of image that is different from the first type of image;
    determining that the pixel is associated with the first type of image; and
    selecting the first pre-determined set of grey scale values as the second set of grey scale values.

13. The method as recited in claim 10, wherein the framebuffer stores content that is associated with a page of a content item displayed by the electronic device and the waveform causes the content to be displayed via a display of the electronic device in association with the page of the content item.

14. A method comprising:
    determining that a first pixel corresponds to at least one of a portion of first text or a portion of a first image;
    determining that a second pixel corresponds to at least one of a portion of second text or a portion of a second image;
    selecting a first mapping that is to be used to cause display of the first pixel in a first shade of grey corresponding to a first grey scale value of a first set of grey scale values, the first grey scale corresponding to a first page of a content item; and selecting a second mapping that is to be used to cause display of the second pixel in a second shade of grey corresponding to a second grey scale value of the first set of grey scale values, at least one of the first grey scale value or the second grey scale value being determined by at least one of a framebuffer, a waveform, or a display controller associated with an electronic device that causes display of at least one of the first pixel or the second pixel, and the second grey scale value corresponding to a second page of the content item.

15. The method as recited in claim 14, further comprising:
determining that the first pixel corresponds to a first color value of a set of color values or a third grey scale value of a second set of grey scale values;
determining that the second pixel corresponds to a second color value of the set of color values or a fourth grey scale value of the second set of grey scale values;
determining, based at least in part on the first mapping, that the first color value or the third grey scale value corresponds to the first grey scale value; and
determining, based at least in part on the second mapping, that the second color value or the fourth grey scale value corresponds to the second grey scale value.

16. The method as recited in claim 15, wherein the first set of grey scale values includes a set of four grey scale values that include a grey scale value corresponding to black, a grey scale value corresponding to white, a grey scale value corresponding to the first shade of grey, and a grey scale value corresponding to the second shade of grey.

17. The method as recited in claim 14, wherein the framebuffer stores content that is associated with the first page of the content item and the second page of the content item, and the waveform causes the content to be displayed via a display of the electronic device in association with the first page of the content item and the second page of the content item.

18. The method as recited in claim 14, further comprising determining that the first text is a first type of font and that the second text is a second type of font.

19. The method as recited in claim 14, further comprising determining that the first image is a first type of image and that the second image is a second type of image.

20. The method as recited in claim 19, wherein the first type of image corresponds to a flat image and the second type of image corresponds to a complex image.

\* \* \* \* \*